(12) United States Patent
Curcio Lindström et al.

(10) Patent No.: US 11,720,329 B2
(45) Date of Patent: Aug. 8, 2023

(54) GENERATING A SHUFFLE SEED

(71) Applicant: Spotify AB, Stockholm (SE)

(72) Inventors: Erik Johan Curcio Lindström, Stockholm (SE); Sven Samuel Erdtman, Uppsala (SE)

(73) Assignee: Spotify AB, Stockholm (SE)

( * ) Notice: Subject to any disclaimer, the term of this patent is extended or adjusted under 35 U.S.C. 154(b) by 0 days.

(21) Appl. No.: 17/178,077

(22) Filed: Feb. 17, 2021

(65) Prior Publication Data

US 2021/0271454 A1 Sep. 2, 2021

(30) Foreign Application Priority Data

Feb. 27, 2020 (EP) .................................... 20159731

(51) Int. Cl.
```
G06F 7/58       (2006.01)
G06F 16/438     (2019.01)
G06F 16/638     (2019.01)
G06Q 30/0282    (2023.01)
G06Q 30/0601    (2023.01)
```
(52) U.S. Cl.
CPC ............ *G06F 7/582* (2013.01); *G06F 16/438* (2019.01); *G06F 16/4387* (2019.01); *G06F 16/639* (2019.01); *G06Q 30/0282* (2013.01); *G06Q 30/0631* (2013.01)

(58) Field of Classification Search
None
See application file for complete search history.

(56) References Cited

U.S. PATENT DOCUMENTS

| | | | | |
|---|---|---|---|---|
| 6,993,532 B1 * | 1/2006 | Platt | ...................... | G06F 16/634 707/916 |
| 8,285,404 B1 * | 10/2012 | Kekki | .................... | G06F 16/639 707/E17.005 |
| 2006/0195790 A1 * | 8/2006 | Beaupre | ............... | G11B 27/105 706/18 |
| 2006/0218187 A1 * | 9/2006 | Plastina | .............. | G06F 16/4387 |
| 2007/0025194 A1 * | 2/2007 | Morse | ................. | G06F 16/9535 369/30.1 |
| 2015/0058367 A1 * | 2/2015 | Brull | ..................... | H04L 67/535 707/754 |

(Continued)

FOREIGN PATENT DOCUMENTS

| KR | 100819991 B1 * | 4/2008 | ......... B60R 11/0211 |
|---|---|---|---|
| WO | WO2017/140786 A1 | 8/2017 | |

OTHER PUBLICATIONS

Spotify AB, Extended European Search Report, EP2015973.7, dated Jul. 9, 2020, 9 pgs.

(Continued)

*Primary Examiner* — Matthew J Ellis
(74) *Attorney, Agent, or Firm* — Morgan, Lewis & Bockius LLP

(57) ABSTRACT

A method for generating a seed for a shuffle algorithm, the method performed by a plurality of computing devices and comprising, at each computing device in the plurality, generating a respective plurality of seeds for a shuffle algorithm, determining a fitness score for each of the generated seeds, and identifying a seed among the generated seeds having the best fitness score, wherein the number of generated seeds is determined based on a predetermined limit.

12 Claims, 5 Drawing Sheets

(56) References Cited

U.S. PATENT DOCUMENTS

2016/0246879 A1* 8/2016 Moss ............... G06F 16/24578

OTHER PUBLICATIONS

Spotify AB, Communication Pursuant to Article 94(3), EP20159731.7, dated Dec. 10, 2020, 6 pgs.
Spotify AB, Summons to Attend Oral Proceedings, EP20159731.7, May 20, 2021, 12 Pgs.
SpotifyAB, Brief Communication Oral Proceedings, EP20159731-7, Oct. 15, 2021, 11 Pgs.
Spotify AB, Acknowledgement of Withrawal of the European Patent Application, EP20159731.7, Oct. 25, 2021, 4 pgs.

* cited by examiner

GENERATING A SHUFFLE SEED

RELATED AND PRIORITY APPLICATIONS

This application claims priority to European Application No. 20159731, filed Feb. 27, 2020, which is hereby incorporated by reference in its entirety.

FIELD

The present disclosure relates to generating a seed for creating a shuffled list of media content items. In particular, it relates to a method performed by a plurality of computing devices for generating a seed for a shuffle algorithm.

BACKGROUND

In modern media content environments which support playlists of media content items, such as songs, music, videos, or other types of media content, a user may want the content in a playback session to be shuffled. For example, a user may wish to consume content in a shuffled order within an artist page or a playlist, to provide a play order of the media content items that is different from a suggested or stored order. It is then advantageous that the shuffled order be available at each device that is used for media playback at different times.

A challenge with current arrangements for playback is that shuffling tends to be performed randomly, such that the same shuffled order is not accurately recreated on different devices. As such, shuffle algorithms that use a seed to generate an order are used. The seed is often a random number that produces the same order of content every time it is applied to the shuffle algorithm. This way, different devices can use the same seed and shuffle algorithm to produce the same order shuffled order of content.

As different devices have different playback capabilities, and users have different tastes, different seeds for the shuffle algorithm are required to generate different shuffle orders. However, simply randomising seeds may not produce useful shuffle orders. Certain random shuffled orders may not provide a play order that is suitable for or acceptable to a user. For example, a random shuffle may still provide a playback order that has the same artist for consecutive songs. Therefore, different seeds, that generally each generate a different order of content, can be assessed for their suitability. This can be done by calculating a fitness score for each seed. Many factors may affect the fitness score of a given seed, for example the even spread of songs by the same artist, or the listening history of the user (where recently played media content items being towards the end of the order improves the score).

Dependent on the criteria used to decide on the fitness of a shuffle order, generating seeds and determining their fitness can be a computationally expensive and lengthy process. For example, thousands of seeds may be generated and tested for their fitness before a useful seed is identified.

It is therefore desired to find a method of generating seeds for shuffle algorithms that is more computationally cheaper and/or requires less time.

SUMMARY

The present disclosure attempts to mitigate at least some of the issues noted above by leveraging the computational power of user devices that wish to receive a seed. Specifically, a seed generation computation that would usually be carried out at a single computing device or server system can be distributed across a number of computing devices each carrying out only a part of the total computation. In this way, the seed can be generated more quickly and efficiently, as computation is performed in parallel.

Once a seed is determined, it can be stored at a central server. In some cases, the seed that is eventually used to determine the shuffle order may be that having the best fitness score. In some cases, if a seed is available having a fitness score that meets a threshold, seed generation and testing on user devices may be stopped.

In accordance with an aspect of the disclosure, there is provided a method for generating a seed for a shuffle algorithm, the method performed by a plurality of computing devices and comprising, at each computing device in the plurality, generating a respective plurality of seeds for a shuffle algorithm, determining a fitness score for each of the generated seeds, and identifying a seed among the generated seeds having the best fitness score, wherein the number of generated seeds is determined based on a predetermined limit.

Optionally, the predetermined limit is a maximum computation time for generating the seeds and determining their respective fitness scores. Optionally, the predetermined limit is a maximum number of seeds to be generated. Optionally, each seed is a random number.

Optionally, determining a fitness score for a seed comprises generating an order of a plurality of media content items using the seed and the shuffle algorithm, and determining a fitness score associated with the order. Optionally, the fitness score is determined based on operational parameters relating to the order.

Optionally, the method further comprises sending the generated seeds and their respective fitness scores to a coordinating computing device for storage at the coordinating computing device. Optionally, the method further comprises determining if a seed stored at the coordinating computing device has a fitness score that meets a threshold, and only generating a respective plurality of seeds for a shuffle algorithm if the seed stored at the coordinating computing device has a fitness score that does not meet the threshold. Optionally, the coordinating computing device is a server device.

Optionally, at least one computing device in the plurality of computing devices is a user device. Optionally, the method further comprises, before generating a respective plurality of seeds for a shuffle algorithm, receiving a user input at the user device. Optionally, the user device is a smartphone, a portable media player, a tablet, a laptop computer or a desktop computer.

In accordance with an aspect of the disclosure, there is provided a computer-readable medium having stored thereon instructions that, when executed by one or more processors cause execution of the method.

In accordance with another aspect of the disclosure, there is provided a system for generating a seed for a shuffle algorithm, the system comprising a plurality of computing devices, wherein each computing device is configured to generate a respective plurality of seeds for a shuffle algorithm, determine a fitness score for each of the generated seeds, and identify a seed among the generated seeds having the best fitness score, wherein the number of seeds in the plurality of seeds is determined based on a predetermined limit.

Optionally, the predetermined limit is a maximum computation time for generating the seeds and determining their respective fitness scores. Optionally, the predetermined limit is a maximum number of seeds to be determined. Optionally, each seed is a random number.

Optionally, each computing device is configured to determine a fitness score for a seed by generating an order of a plurality of media content items using the seed and the shuffle algorithm, and determining a fitness score associated with the order. Optionally, the fitness score is determined based on operational parameters relating to the order.

Optionally, system comprises a coordinating computing device configured to receive the generated seeds and their respective fitness scores from the other computing devices in the system. Optionally, the coordinating computing device is configured to store at least the seed having the best fitness score in a memory. Optionally, each computing device in the system is configured to determine if the seed stored at the coordinating computing device has a fitness score that meets a threshold, and only generate a respective plurality of seeds for a shuffle algorithm if the seed stored at the coordinating computing device has a fitness score that does not meet the threshold. Optionally, the coordinating computing device is a server device.

Optionally, at least one computing device in the plurality of computing devices is a user device. Optionally, the user device is configured to receive a user input before generating a respective plurality of seeds for a shuffle algorithm. Optionally, the user device is a smartphone, a portable media player, a tablet, a laptop computer or a desktop computer.

In accordance with an aspect of the disclosure, there is provided a system for generating a seed for a shuffle algorithm, the system comprising a coordinating computing device and a plurality of client computing devices, wherein the coordinating computing device is configured to provide an indication to each client computing device that a respective plurality of seeds for a shuffle algorithm should be generated, wherein the number of seeds in the plurality of seeds is determined based on a predetermined limit, and receive from each client computing device at least one generated seed along with an associated fitness score.

Optionally, the predetermined limit is a maximum computation time for generating the seeds and determining their respective fitness scores. Optionally, the predetermined limit is a maximum number of seeds to be determined. Optionally, each seed is a random number.

Optionally, the coordinating computing device is configured to store at least the seed having the best fitness score in a memory. Optionally, each computing device in the system is configured to determine if the seed stored at the coordinating computing device has a fitness score that meets a threshold, and only generate a respective plurality of seeds for a shuffle algorithm if the seed stored at the coordinating computing device has a fitness score that does not meet the threshold. Optionally, the coordinating computing device is a server device.

Optionally, a fitness score for a seed is determined by generating an order of a plurality of media content items using the seed and the shuffle algorithm, and determining a fitness score associated with the order. Optionally, the fitness score is determined based on operational parameters relating to the order.

Optionally, at least one computing device in the plurality of computing devices is a user device. Optionally, the user device is a smartphone, a portable media player, a tablet, a laptop computer or a desktop computer.

The methods disclosed herein leverage the computational power of user devices in a system for providing media content to generate and test seeds for a shuffle algorithm. Specifically, a seed generation computation that would usually be carried out at a single computing device or server system can be distributed across a number of computing devices each carrying out only a part of the total computation. In this way, the seeds can be generated more quickly and efficiently. This is particularly advantageous in systems that have access to large numbers of computing devices, such as a subscription-based media streaming service that may have millions of subscribers each operating one or more computing devices. Furthermore, by putting a limit on the number of seeds that are generated and tested at each device, it can be ensured that each device that contributes to the computation is not overburdened. The most suitable seed can be identified by comparing fitness scores of all generated seeds. The identified can be stored at a central server for retrieval by user devices that receive a shuffle request.

BRIEF DESCRIPTION OF THE DRAWINGS

Exemplary embodiments of the disclosure shall now be described with reference to the drawings in which.

Throughout the description and the drawings, like reference numerals refer to like parts.

SPECIFIC DESCRIPTION

Figure 1:
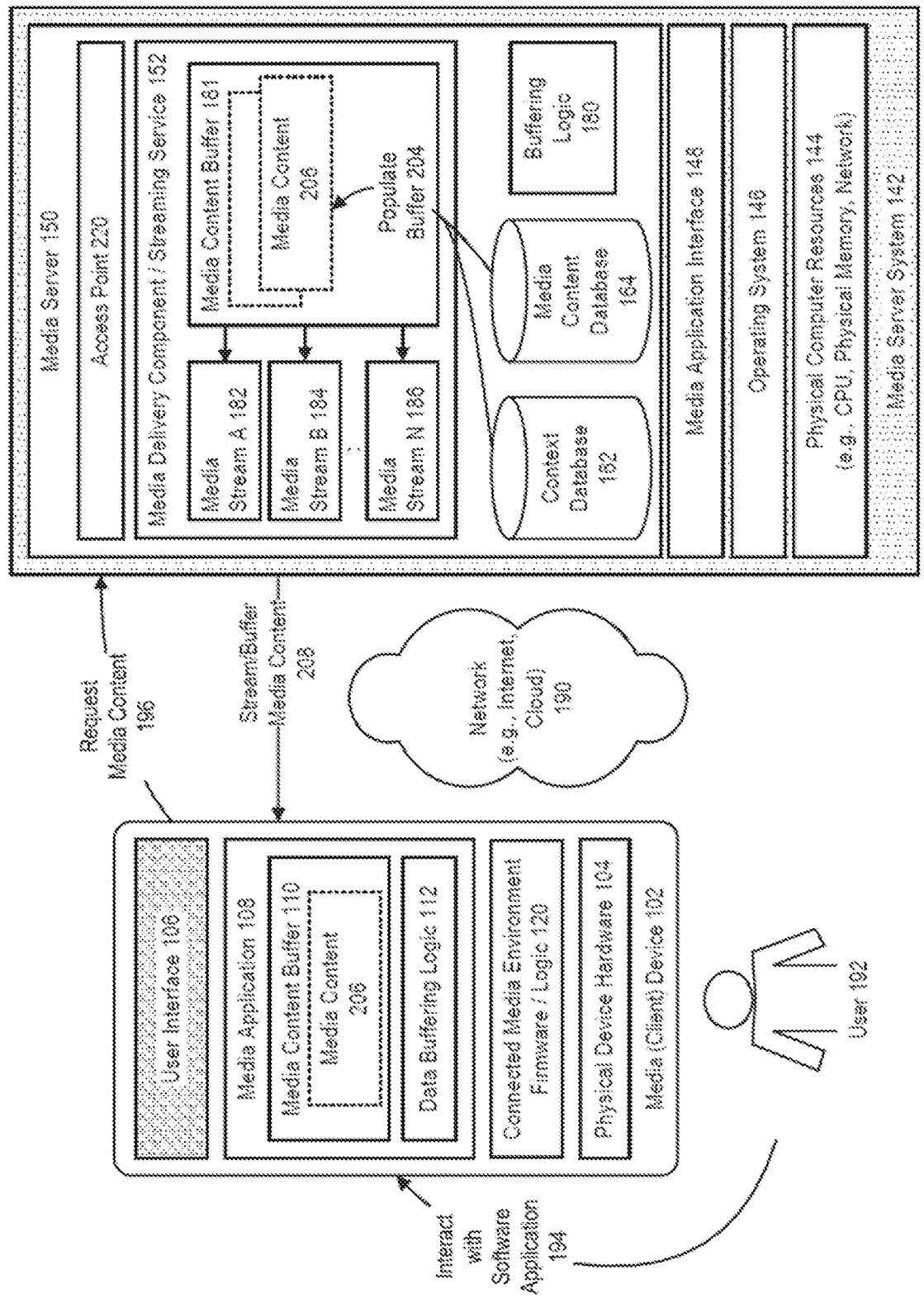
FIG. 1 illustrates an example of a system for providing media content, in accordance with an embodiment.

FIG. 1 illustrates an example of a system for providing media content, in accordance with an embodiment. As illustrated in FIG. 1, in accordance with an embodiment, a media device 102, operating as a client device, can receive and play media content provided by a backend media server system 142 (media server), or by another system or peer device.

In accordance with an embodiment, the client device can be, for example, a personal computer system, handheld entertainment device, tablet device, smartphone, television, audio speaker, in-car entertainment system, or other type of electronic or media device that is adapted or able to prepare a media content for presentation, control the presentation of media content, and/or play or otherwise present media content. In accordance with an embodiment, each of the client device and the media server can include, respectively, one or more physical device or computer hardware resources 104, 144, such as one or more processors (CPU), physical memory, network components, or other types of hardware resources. Although, for purposes of illustration, a single client device and media server are shown, in accordance with an embodiment a media server can support the simultaneous use of a plurality of client devices. Similarly, in accordance with an embodiment, a client device can access media content provided by a plurality of media servers, or switch between different media streams produced by one or more media servers.

In accordance with an embodiment, the client device can optionally include a user interface 106, which is adapted to display media options, for example as an array of media tiles, thumbnails, or other format, and to determine a user interaction or input. For example, a user input can be made by a touch on a touch screen, or by an audible voice commend input to a voice command interface comprising a microphone. Selecting a particular media option, for example a particular media tile or thumbnail, can be used as a command by a user and/or the client device, to the media server, to download, stream or otherwise access a corresponding particular media content item or stream of media content.

In accordance with an embodiment, the client device can also include a media application 108, together with an in-memory client-side media content buffer 110, and a data buffering logic 112. These can be used to control the playback of media content received from the media server, for playing either at a requesting client device (i.e., controlling device) or at a controlled client device (i.e., controlled device), in the manner of a remote control. A connected media environment firmware/logic 120 enables the device to participate within a connected media environment.

In accordance with an embodiment, the data buffering logic, together with the media content buffer, enables a portion of media content items, or samples thereof, to be pre-buffered at a client device. For example, while media options are being prepared for display on a user interface, e.g., as media tiles or thumbnails, their related media content can be pre-buffered at the same time, and cached by one or more client devices in their media content buffers, for prompt and efficient playback when required.

In accordance with an embodiment, the media server system can include an operating system 146 or other processing environment that supports execution of a media server 150 that can be used, for example, to stream music, video, or other forms of media content to a client device, or to a controlled device.

In accordance with an embodiment, the media server can provide a subscription-based media streaming service, for which a client device or user can have an associated account and credentials, and which enable the user's client device to communicate with and receive content from the media server. A received media-access request from a client device can include information such as, for example, a network address, which identifies a destination client device to which the media server should stream or otherwise provide media content, in response to processing the media-access request.

For example, a user may own several client devices, such as a smartphone and an audio speaker, which can play media content received from a media server. In accordance with an embodiment, identifying information provided with a media-access request can include an identifier, such as an IP address, MAC address, or device name, which identifies that the media-access request is intended for use with a particular destination device. This allows a user, for example, to use their smartphone to control a peripheral device, such as an audio speaker, to which media content should be sent. The media server can then send the requested media and/or forward the media-access request to the audio speaker, even though the request originated at the user's smartphone.

In accordance with an embodiment, a media application interface 148 can receive requests from client devices, or from other systems, to retrieve media content from the media server. A context database 162 can store data associated with the presentation of media content by a client device, including, for example, a current position within a media stream that is being presented by the client device, or a playlist associated with the media stream, or one or more previously-indicated user playback preferences. The media server can transmit context information associated with a media stream to a client device that is presenting that stream, so that the context information can be used by the client device, and/or displayed to the user. The context database can be used to store a media device's current media state at the media server, and synchronise that state between devices, in a cloud-like manner. Alternatively, media state can be shared in a peer-to-peer manner, wherein each device is aware of its own current media state that is then synchronised with other devices as needed.

In accordance with an embodiment, when the destination client device to which the media content is being streamed changes, for example from a controlling device to a controlled device, or from a first controlled device to a second controlled device, the media server can transmit context information associated with an active media content to the newly-appointed destination device for use by that device in playing the media content.

In accordance with an embodiment, a media content database 164 can include media content, for example, music, songs, videos, movies, podcasts, or other media content, together with metadata describing that media content. The metadata can be used to enable users and client devices to search within repositories of media content, to locate particular media content items.

In accordance with an embodiment, a buffering logic 180 can be used to retrieve or otherwise access media content items in response to requests from client devices or other systems, and to populate a server-side media content buffer 181, at a media delivery component/streaming service 152, with streams 182, 184, 186 of corresponding media content data, which can then be returned to the requesting device or to a controlled device.

In accordance with an embodiment, a plurality of client devices, media server systems, and/or controlled devices, can communicate with one another using a network, for example the Internet 190, a local area network, peer-to-peer connection, wireless or cellular network, or other form of network. For example, a user 192 can interact 194 with the user interface at a client device and issue requests to access media content. For example, a user request may be for the playing of a selected music or video item at their client device or at a controlled device, or the streaming of a media channel or video stream to their client device or to a controlled device.

In accordance with an embodiment, the user's selection of a particular media option can be communicated 196 to the media server, via the server's media application interface. The media server can populate its media content buffer at the server 204, with corresponding media content 206, including one or more streams of media content data. The media server can then communicate 208 the selected media content to the user's client device, or to the controlled device as appropriate, where it can be buffered in a media content buffer for playing at the device.

In accordance with an embodiment, and as further described below, the system can include a server-side media gateway or access point 220, or other process or component, which operates as a load balancer in providing access to one or more servers, for use in processing requests at those servers. The system can enable communication between a client device and a server via an access point at the server, and optionally the use of one or more routers, to allow requests from the client device to be processed either at that server and/or at other servers.

For example, in a Spotify media content environment, most Spotify clients connect to various Spotify back-end processes via a gateway or access point, which forwards client requests to other servers, such as sending one or more metadataproxy requests to one of several metadataproxy machines on behalf of the client or end user.

Figure 2:
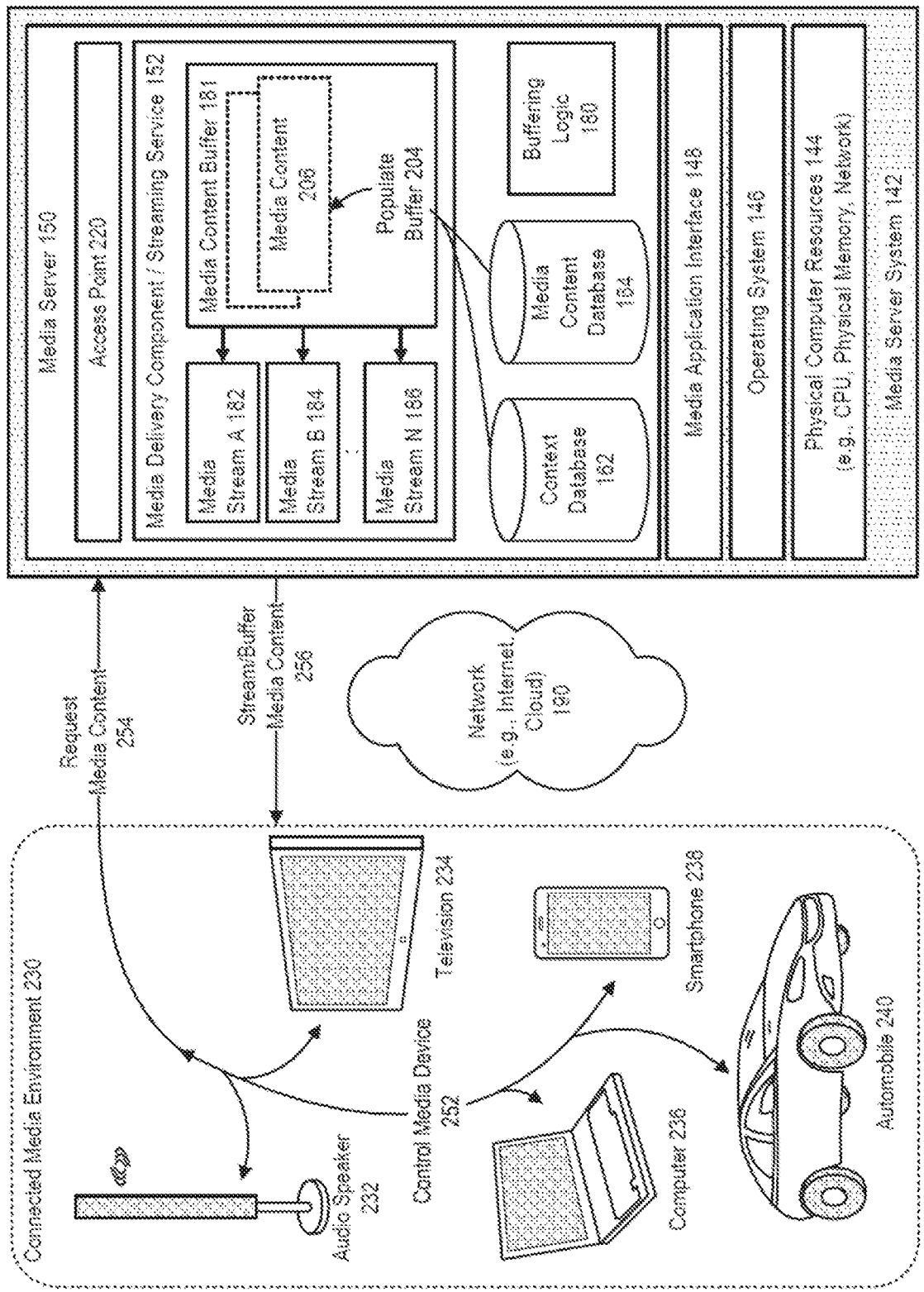
FIG. 2 further illustrates an example of a system for providing media content, in accordance with an embodiment.

FIG. 2 further illustrates an example of a system for providing media content, in accordance with an embodiment. As illustrated in FIG. 2, in accordance with an embodiment, a connected media environment 230, for example a Spotify Connect environment, enables communication between a client device and the server-side access point in a connected manner from the perspective of a user. Examples of the types of media device that can be provided within a connected media environment include audio speakers 232, televisions 234, computers 236, smartphones 238, and in-car entertainment systems 240, or other types of media device.

In accordance with an embodiment, a client device having an application user interface can act as a controlling client device, to control 252 the playback of media content at a controlled device. In accordance with an embodiment, a client device can itself act as a media gateway or access point, for use by other devices within the system for providing media content.

In accordance with an embodiment, a controlled device can also include a media application, which in the case of an audio speaker, television or similar device can be included within the device itself as firmware logic, or within, for example, a separate set-top box or similar after-market device.

As described above, in accordance with an embodiment, a user can interact with the user interface at a client device, and issue requests to access media content. For example, a user request may be for the playing of a selected music or video item at their client device or at a controlled device, or the streaming of a media channel or video stream to their client device or to a controlled device.

For example, in accordance with an embodiment, a user can request that media content be buffered, streamed or received and played at a controlling client device such as a smartphone, and simultaneously buffered, streamed or received for playing at one or more controlled devices, such as an audio speaker. Similarly, for example, the user can issue a media-change request 254 to change a media channel, in response to which the media server can switch the media channel at the controlled device, and thereafter continue to stream or buffer media content 256 for the switched channel, at the controlled device.

As described above, in some instances, a portion of the media content can be pre-buffered at the controlled device, so that the switching to the channel at the controlled device operates in a seamless manner.

Figure 3:
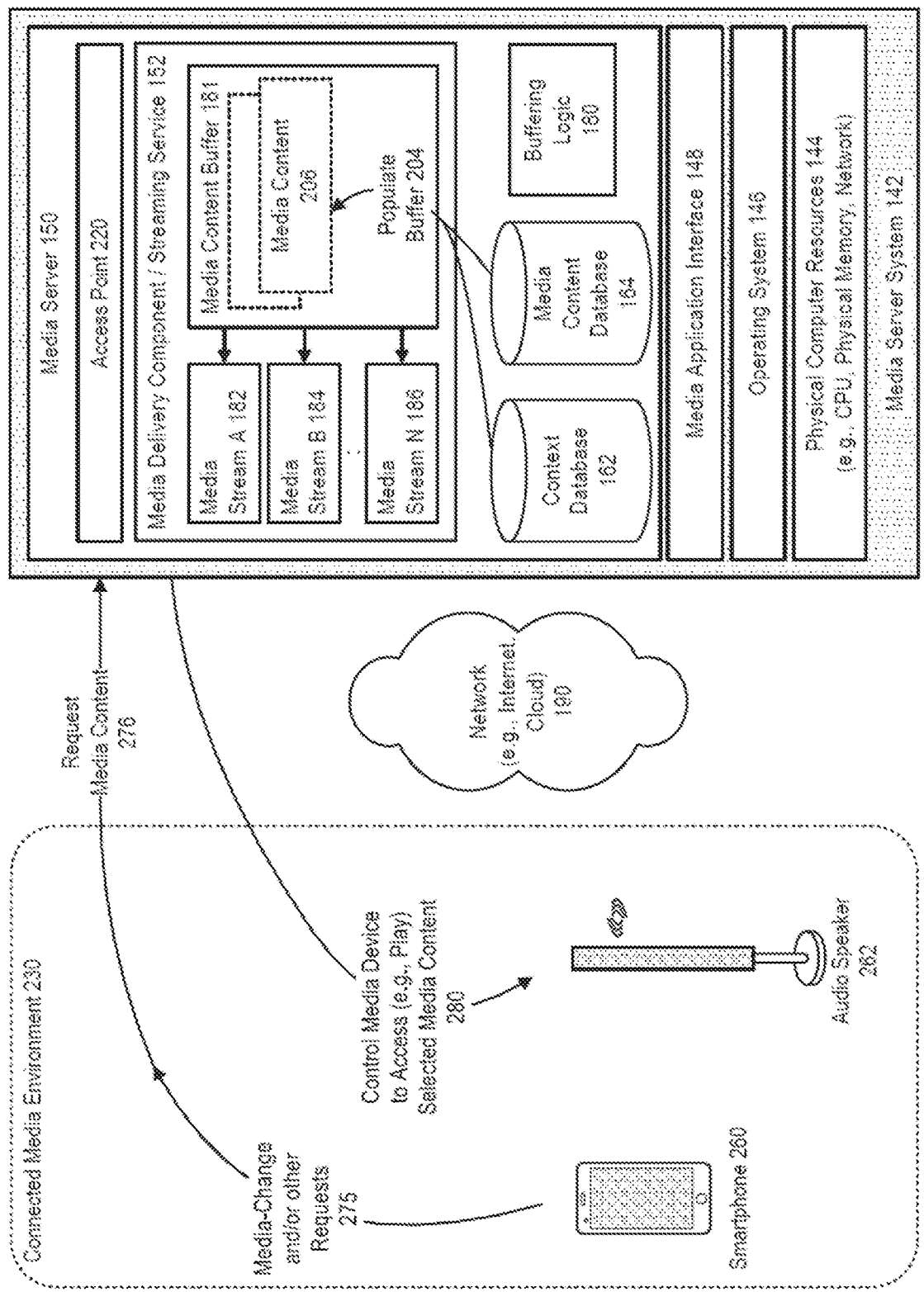
FIG. 3 further illustrates an example of a system for providing media content, in accordance with an embodiment.

FIG. 3 further illustrates an example of a system for providing media content, in accordance with an embodiment. As illustrated in FIG. 3, a user can utilise, for example, a smartphone 260 in combination with an audio speaker 262, to issue a media-change request 275 from the smartphone, for example, to change a media channel at the audio speaker. The request can be received by the media gateway or access point, and communicated to the local media server, or to other media servers, as a request for media content 276, which can then respond by controlling the destination device (in this example, the audio speaker) to access (e.g., play) the selected media content 280.

As described above, a system for providing media content may exist with many client computing devices that each have some computing power. This computing power can be leveraged to generate seeds for shuffle algorithms and determine their fitness in order to identify useful seeds. In this way, the computational burden associated with generating and testing a large number of seeds may be removed from a single device. As such, the identification of useful seeds can be performed more quickly and efficiently. Furthermore, generation of a large number of seeds enables higher fitness scores to be obtained, as more seeds are tested.

Figure 4:
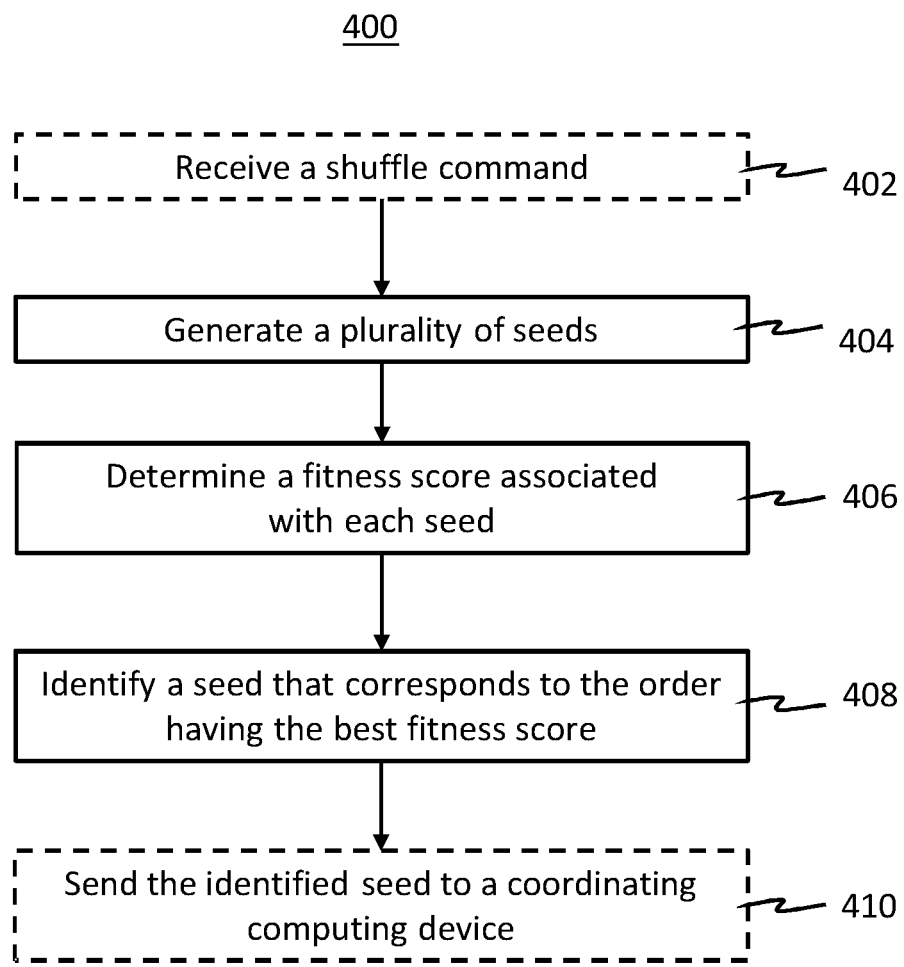
FIG. 4 is a flow diagram showing a method 400 for generating a seed for a shuffle algorithm, in accordance with an embodiment.

FIG. 4 is a flow diagram showing a method 400 for generating a seed for a shuffle algorithm. The method leverages computing power from across a plurality of computing devices, such as the devices shown in FIGS. 1 to 3, to generate and test a number of seeds with a view to identifying a suitable seed for future use.

The method 400 is performed at each computing device in a plurality of computing devices. The plurality of computing devices may be two or more devices in a system for providing media content. In some embodiments, the plurality of computing devices may comprise two or more client devices (also referred to as user devices). In some embodiments, the plurality of computing devices may comprise one or more client devices and one or more server devices. In some embodiments, the plurality of computing devices may comprise all the client devices in a system for providing media content. In some embodiments, the plurality of computing devices may comprise all the computing devices in a system for providing media content, that is to say all client and server devices in the system.

As such, the plurality of computing devices may comprise a number of client devices, such as a client device 102, audio speakers 232, 262, televisions 234, computers 236, smartphones 238, 260, and in-car entertainment systems 240 or other types of media device such as portable media players and tablets. In some embodiments, the client devices may be associated with subscribers to a subscription-based media streaming service, and/or be connected in a media content environment, such as a Spotify media content environment discussed above. The plurality of computing devices may also comprise a server system, such as the media server system 142. The computing devices may be connected via a network, for example the Internet 190, a local area network, peer-to-peer connection, wireless or cellular network, or other form of network.

At step 402, a device receives a shuffle command. This may be a shuffle command input by a user, for example user 192 through user interface 106. In some embodiments, the shuffle commend can be made by a touch on a touch screen, or by an audible voice commend input to a voice command interface comprising a microphone. The shuffle command may indicate a wish to shuffle a particular list of media content items. Receipt of the shuffle command may trigger the start of method 400. Alternatively, the method 400 may not require a shuffle command to be input and may begin, for example, on start-up of an app, or selection of an artist or playlist. In the case that the method 400 begins on selection of an artist or playlist, an indication may be present in the artist or playlist data that instructs the device to begin the method 400.

At step 404, the device generates a plurality of seeds for a shuffle algorithm. A shuffle algorithm takes a plurality of media content items in a first order and shuffles them into a second order. The second order that is generated depends on the seed that is input to the shuffle algorithm. If the same seed and the same plurality of media content items are input to the shuffle algorithm, then the output will always be the same. Equally, in most cases, a different seed will produce a different second order. Whilst, in theory, different seeds could generate the same shuffled order (for example, if the list of media content items is very short), for lists of media content with more than a few items, the likelihood of this is very low. This provides a simple and efficient way for a shuffled order to be recreated as, to do so, a device only requires the shuffle algorithm and the relevant seed and media content.

Each seed may be a random number, for example generated by a pseudo-random number generator (PRNG) algorithm as known in the art. Alternatively, the seeds may be generated in a systematic manner, for example by increasing the previous seed by a predetermined increment. Each seed that is generated is a candidate seed for later use.

The number of seeds that the device generates is determined based on a predetermined limit. In one example, the device may be given a maximum computation time for generating the seeds and determining their respective fitness scores. The maximum computation time may be different for each computing device, or may be the same for all devices. In another example, the device may be given a maximum number of seeds to be generated. Again, the maximum number of seeds may be different for each computing device, or may be the same for all devices. In some embodiments, the maximum computation time or maximum number of seeds for a given device may be determined based on the computational capacity of that device. By putting a limit on the number of seeds that are generated and tested at each device, it can be ensured that each device that contributes to the computation is not overburdened, either in terms of computational capacity, storage capacity or battery usage.

At step 406, the device determines a fitness score for each of the seeds generated in step 404. A fitness score relating to a particular seed represents its suitability for eventual selection, and is a value that can be compared to other fitness scores, for example an integer or a floating point value. The suitability of the seed can be indicated by a fitness score being high or low, dependent on the parameters used to determine the fitness score.

The determination of fitness scores may be based on operational parameters relating to the seed and/or the shuffled order that it generates. This allows for differentiation between the different seeds based on, for example, storage requirements, transmission efficiency, and other parameters relating to operation of a device implementing the shuffle. In this way, the seed generating the most efficient shuffled order may be selected for further use. In some embodiments, the fitness score relating to a particular seed is determined based on a single operation parameter. In other embodiments, a fitness score relating to a particular seed is determined based on a number of operation parameters, for example as a weighted sum of multiple fitness scores. This may give a better overall view of how a shuffled order generated by particular seed will perform in terms of efficient operation of a device. In some embodiments, the fitness score may be based on properties of the media content items. For example, a fitness score may be based on the even spread of songs by the same artist, tempo, musical key or the track licensor. In one example, a composite fitness score may be determined, which combines the even spread of songs by the same artist and the listening history of the user into a single score that strikes a balance between providing a good spread and not putting too many recently played media content items towards the start of the list.

At step 408, the seed having the best fitness score is identified. This can be achieved by comparing the fitness scores determined in step 406 for each of the seeds generated in step 404. In this way, the seed generating the most suitable shuffled order may be selected for further use. In some embodiments, the highest fitness score indicates the best seed. In other embodiments, a lowest fitness score may indicate the best seed, as discussed above.

At step 410, the identified seed and its respective fitness score may be sent to a coordinating computing device. The coordinating computing device may be one of the plurality of computing devices performing the method, or may be another computing device. In some embodiments, the coordinating computing device is a server device or system, such as the media server system 142. The seed identified and its respective fitness score may then be saved in a memory associated with the coordinating computing device. In some embodiments, the coordinating computing device may receive seeds and fitness scores from one or more of the plurality of computing devices performing the method. In some embodiments, all of the plurality of computing devices performing the method send third identified seed and its respective fitness score to the coordinating computing device. The coordinating computing device may also generate its own seeds and fitness scores. The coordinating computing device may store only the seed having the best fitness score among all the generated seeds. In this way, a controlling computing device can store a most suitable seed of a large number of seeds that have been generated and tested. The computational requirements of generating and testing so many seeds is shared among a plurality of devices, rather than being borne only by the controlling computing device. As such, a most suitable seed for further use can be identified in a computationally efficient manner.

In some embodiments, prior to generating a plurality of seeds at step 404, a device may check to see if a suitable seed is already stored at the coordinating computing device. For example, a threshold fitness score could be used that indicates a suitable level. Once a seed is identified that meets the threshold, no further seeds need to be generated and tested. If no seed has been identified that meets the threshold, the device may proceed with the steps of method 400. For example, no seeds may be stored at the coordinating computing device or any seeds that are stored at the coordinating computing device have fitness scores that do not meet the threshold. However, if a seed stored at the coordinating computing device has a fitness score that meets the threshold, the device does not need to generate and test any seeds. In this way, computing capacity in the system is saved, as it is not used when not necessary.

In some embodiments, a device may generate and test a plurality of seeds, and perform a check to see if a suitable seed is already stored at the coordinating computing device before sending an identified seed and its respective fitness score to a coordinating computing device at step 410. The determination of whether a suitable seed is already stored at the coordinating computing device may be performed in one of the manners discussed above. In this way, bandwidth and/or transmission capacity in the system is saved as it is not used when not necessary.

A stored seed can then be retrieved by any client device in the system that receives a shuffle request. The client device can then recreate the playlist using the seed and the shuffle algorithm stored on the device.

The methods disclosed herein leverage the computational power of user devices in a system for providing media content to generate and test seeds for a shuffle algorithm.

Specifically, a seed generation computation that would usually be carried out at a single computing device or server system can be distributed across a number of computing devices each carrying out only a part of the total computation. In this way, the seeds can be generated more quickly and efficiently. This is particularly advantageous in systems that have access to large numbers of computing devices, such as a subscription-based media streaming service that may have millions of subscribers each operating one or more computing devices. Furthermore, by putting a limit on the number of seeds that are generated and tested at each device, it can be ensured that each device that contributes to the computation is not overburdened. The most suitable seed can be identified by comparing fitness scores of all generated seeds. The identified can be stored at a central server for retrieval by user devices that receive a shuffle request.

Figure 5:
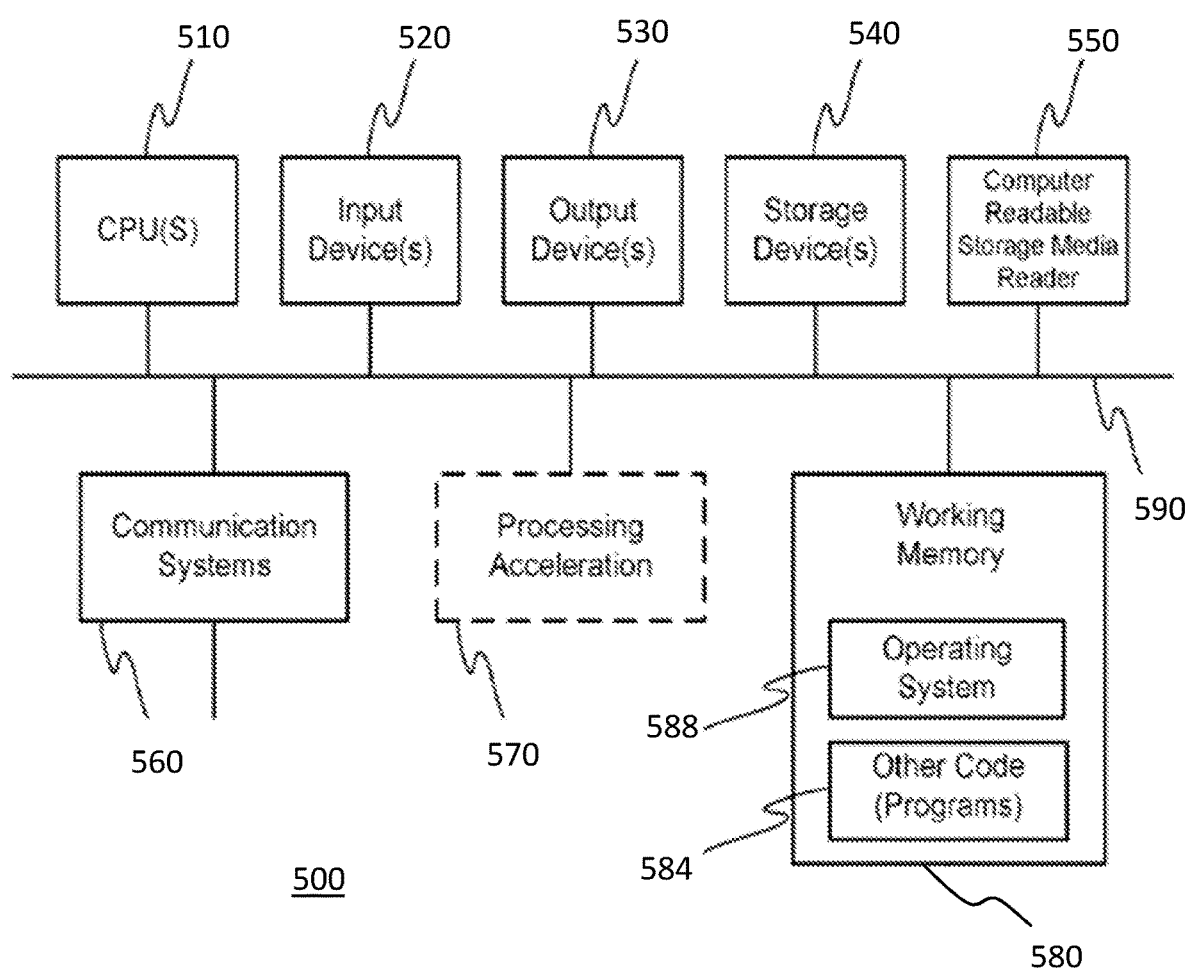
FIG. 5 is a block diagram illustrating an exemplary computer system 500 in which embodiments of the present disclosure may be implemented.

FIG. 5 is a block diagram illustrating an exemplary computer system 500 in which embodiments of the present disclosure may be implemented. This example illustrates a computer system 500 such as may be used, in whole, in part, or with various modifications, to provide the functions of the disclosed system. For example, various functions may be controlled by the computer system 500, including, merely by way of example, generating, determining, identifying. receiving, etc.

The computer system 500 is shown comprising hardware elements that may be electrically coupled via a bus 590. The hardware elements may include one or more central processing units 510, one or more input devices 520 (e.g., a mouse, a keyboard, etc.), and one or more output devices 530 (e.g., a display device, a printer, etc.). The computer system 500 may also include one or more storage device 540. By way of example, the storage device(s) 540 may be disk drives, optical storage devices, solid-state storage device such as a random-access memory ("RAM") and/or a read-only memory ("ROM"), which can be programmable, flash-updateable and/or the like.

The computer system 500 may additionally include a computer-readable storage media reader 550, a communications system 560 (e.g., a modem, a network card (wireless or wired), an infra-red communication device, Bluetooth™ device, cellular communication device, etc.), and a working memory 580, which may include RAM and ROM devices as described above. In some embodiments, the computer system 500 may also include a processing acceleration unit 570, which can include a digital signal processor, a special-purpose processor and/or the like.

The computer-readable storage media reader 550 can further be connected to a computer-readable storage medium, together (and, optionally, in combination with the storage device(s) 540) comprehensively representing remote, local, fixed, and/or removable storage devices plus storage media for temporarily and/or more permanently containing computer-readable information. The communications system 560 may permit data to be exchanged with a network, system, computer and/or other component described above.

The computer system 500 may also comprise software elements, shown as being currently located within the working memory 580, including an operating system 588 and/or other code 584. It should be appreciated that alternative embodiments of a computer system 500 may have numerous variations from that described above. For example, customised hardware might also be used and/or particular elements might be implemented in hardware, software (including portable software, such as applets), or both.

Furthermore, connection to other computing devices such as network input/output and data acquisition devices may also occur.

Software of the computer system 500 may include code 584 for implementing any or all of the function of the various elements of the architecture as described herein. For example, software, stored on and/or executed by a computer system such as the system 500, can provide the functions of the disclosed system. Methods implementable by software on some of these components have been discussed above in more detail.

The invention has now been described in detail for the purposes of clarity and understanding. However, it will be appreciated that certain changes and modifications may be practiced within the scope of the appended claims.

What is claimed is:

1. A method for generating a seed for a shuffle algorithm, the method performed by a first computing device, the method comprising:
   before generating a first seed for the shuffle algorithm, determining if a seed of a plurality of generated seeds stored at a second computing device has a fitness score that meets a threshold, wherein the fitness score represents how the seed performs in producing a shuffled order for a playlist;
   in accordance with a determination that the second computing device is not storing a seed that has a fitness score that meets the threshold, generating the first seed for the shuffle algorithm;
   determining a fitness score for the first seed, wherein the fitness score represents how the first seed performs in producing a shuffled order for a playlist;
   sending the first seed and its fitness score to a second computing device for storage;
   receiving, from the second computing device, a second seed selected, by the second computing device, from the plurality of generated seeds stored at the second computing device, the plurality of generated seeds including the first seed, wherein the second seed is selected by the second computing device based on the second seed having the best fitness score of the plurality of generated seeds stored at the second computing device; and
   generating, using the selected second seed, a shuffled order for the playlist to display for a user.

2. The method of claim 1, wherein the first computing device generates one or more seeds within a predetermined limit, and the predetermined limit is a maximum computation time for generating the one or more seeds determining their respective fitness scores.

3. The method of claim 1, wherein the first computing device generates one or more seeds within a predetermined limit, and the predetermined limit is a maximum number of seeds to be generated.

4. The method of claim 1, wherein each seed is a random number.

5. The method of claim 1, wherein determining a fitness score for the first seed comprises:
   generating a shuffled order of a plurality of media content items using the first seed and the shuffle algorithm; and
   determining a fitness score associated with the shuffled order.

6. The method of claim 1, wherein the fitness score is determined based on operational parameters relating to the shuffled order for the playlist.

7. The method of claim 1, wherein the second computing device is a server device.

8. The method of claim 1, wherein the first computing device is a user device.

9. The method of claim 8, further comprising, before generating the first seed for a shuffle algorithm, receiving a user input at the user device.

10. The method of claim 8, wherein the user device is a smartphone, a portable media player, a tablet, a laptop computer or a desktop computer.

11. A non-transitory computer-readable medium having stored thereon instructions that, when executed by one or more processors of a first computing device cause execution of a set of operations, comprising:

before generating a first seed for a shuffle algorithm, determining if a seed of a plurality of generated seeds stored at a second computing device has a fitness score that meets a threshold, wherein the fitness score represents how the seed performs in producing a shuffled order for a playlist;

in accordance with a determination that the second computing device is not storing a seed that has a fitness score that meets the threshold, generating the first seed for the shuffle algorithm;

determining a fitness score for the first seed, wherein the fitness score represents how the first seed performs in producing a shuffled order for a playlist;

sending the first seed and its fitness score to a second computing device for storage;

receiving, from the second computing device, a second seed selected, by the second computing device, from the plurality of generated seeds stored at the second computing device, the plurality of generated seeds including the first seed, wherein the second seed is selected by the second computing device based on the second seed having the best fitness score of the plurality of generated seeds stored at the second computing device; and generating, using the selected second seed, a shuffled order for the playlist to display for a user.

12. A first computing device, comprising:

one or more processors;

memory storing instructions for performing a set of operations, comprising:

before generating a first seed for a shuffle algorithm, determining if a seed of a plurality of generated seeds stored at a second computing device has a fitness score that meets a threshold, wherein the fitness score represents how the seed performs in producing a shuffled order for a playlist;

in accordance with a determination that the second computing device is not storing a seed that has a fitness score that meets the threshold, generating the first seed for the shuffle algorithm;

determining a fitness score for the first seed, wherein the fitness score represents how the first seed performs in producing a shuffled order for a playlist;

sending the first seed and its fitness score to a second computing device for storage;

receiving, from the second computing device, a second seed selected, by the second computing device, from the plurality of generated seeds stored at the second computing device, the plurality of generated seeds including the first seed, wherein the second seed is selected by the second computing device based on the second seed having the best fitness score of the plurality of generated seeds stored at the second computing device; and generating, using the selected second seed, a shuffled order for the playlist to display for a user.

* * * * *